United States Patent
Michos et al.

(10) Patent No.: US 12,305,143 B2
(45) Date of Patent: May 20, 2025

(54) USING SILICA-ZIRCONIA CATALYSTS IN PROCESSES TO REDUCE GLYCIDOL, GLYCIDYL ESTERS, OR BOTH GLYCIDOL AND GLYCIDYL ESTERS

(71) Applicant: W.R. GRACE & CO.-CONN., Columbia, MD (US)

(72) Inventors: Demetrius Michos, Clarksville, MD (US); Chelsea L. Grimes, Stoney Beach, MD (US); Cristian Libanati, Silver Spring, MD (US); Ignazio Catucci, Busto Garolfo (IT)

(73) Assignee: W.R. GRACE & CO.-CONN., Columbia, MD (US)

( * ) Notice: Subject to any disclaimer, the term of this patent is extended or adjusted under 35 U.S.C. 154(b) by 634 days.

(21) Appl. No.: 17/608,733

(22) PCT Filed: Apr. 23, 2020

(86) PCT No.: PCT/US2020/029470
§ 371 (c)(1),
(2) Date: Nov. 3, 2021

(87) PCT Pub. No.: WO2020/226905
PCT Pub. Date: Nov. 12, 2020

(65) Prior Publication Data
US 2022/0275307 A1    Sep. 1, 2022

Related U.S. Application Data

(60) Provisional application No. 62/844,033, filed on May 6, 2019.

(51) Int. Cl.
*C11B 3/02* (2006.01)
*B01J 21/06* (2006.01)
*B01J 21/08* (2006.01)
*B01J 23/00* (2006.01)

(52) U.S. Cl.
CPC .............. *C11B 3/02* (2013.01); *B01J 21/066* (2013.01); *B01J 21/08* (2013.01); *B01J 23/002* (2013.01)

(58) Field of Classification Search
CPC ... C11B 3/02; C11B 3/08; B01J 21/066; B01J 21/08; B01J 23/002; B01J 21/06
See application file for complete search history.

(56) References Cited

U.S. PATENT DOCUMENTS

| 2012/0238770 A1 | 9/2012 | Bloomer et al. |
| 2012/0276602 A1 | 11/2012 | Joergensen et al. |
| 2013/0219774 A1 | 8/2013 | Venderbosch et al. |
| 2014/0109466 A1* | 4/2014 | Schmidt .................. C10L 1/026 44/388 |
| 2018/0148665 A1 | 5/2018 | Goodrich et al. |

FOREIGN PATENT DOCUMENTS

| CN | 1299298 A | | 6/2001 | |
| CN | 107090353 A | | 8/2017 | |
| EP | 2 042 588 A1 | | 4/2009 | |
| EP | 2042588 | * | 4/2009 | |
| JP | 2006-205141 A | | 8/2006 | |
| KR | 20030033223 A | * | 6/2004 | ............... A61K 8/25 |
| WO | WO-2017/164728 A1 | | 9/2017 | |
| WO | WO2019/007641 | * | 1/2019 | |
| WO | WO-2019/007641 A1 | | 1/2019 | |

OTHER PUBLICATIONS

International Search Report and Written Opinion on PCT/US2020/029470 dated Jul. 24, 2020 (7 pages).
Foreign Search Report on EP patent application No. 20801957.0 dated Dec. 2, 2022 (10 pages).

* cited by examiner

*Primary Examiner* — Yate' K Cutliff
(74) *Attorney, Agent, or Firm* — DORITY & MANNING, P.A.

(57) ABSTRACT

Methods of using silica-zirconia catalysts in processes to reduce an amount of glycidol, glycidyl ester(s), or both glycidol and glycidyl ester(s) from a triglyceride-containing composition, such as edible oils, are disclosed. Silica-zirconia catalysts and methods of making silica-zirconia catalysts are also disclosed.

20 Claims, No Drawings

USING SILICA-ZIRCONIA CATALYSTS IN PROCESSES TO REDUCE GLYCIDOL, GLYCIDYL ESTERS, OR BOTH GLYCIDOL AND GLYCIDYL ESTERS

CROSS-REFERENCE TO RELATED PATENT APPLICATIONS

This application is a U.S. national stage entry application filed under 35 U.S.C. 371, and claims the benefit of and priority to PCT/US2020/029470, having a filing date of Apr. 23, 2020, which in turns claims the benefit of and priority to U.S. Provisional Patent Application No. 62/844,033, having a filing date of May 6, 2019, both of which are incorporated herein by reference in their entirety for all purposes.

FIELD OF THE INVENTION

The present invention is directed to methods of using silica-zirconia catalysts in processes to reduce an amount of glycidol, glycidyl esters, or both glycidol and glycidyl esters in a triglyceride-containing composition. The present invention is also directed to silica-zirconia catalysts and methods of making silica-zirconia catalysts.

BACKGROUND

Glycidyl esters are known carcinogens and mutagens found in processed edible oil. These heat-generated contaminants form at temperatures as low as 200° C.; however, much higher temperatures are required during the deodorization process to remove various volatile components from the oil. After crude oil is once refined, bleached, and deodorized (RBD), additional oil processing is required to lower the glycidyl ester concentrations to acceptable regulatory limits. These reduction methods include a wide variety of process combinations including, but not limited to, contacting the oil with an enzyme, shear mixing the oil with an acid, rebleaching the oil, and/or rerunning the deodorization at a lower temperature, but for an extended period of time. These known methods are not only inefficient and costly to operate, but further degrade the oil quality and reduce market price.

There remains a need in the art for effective methods for reducing heat-generated contaminants, such as glycidyl esters, from triglyceride-containing compositions such as edible oils.

SUMMARY

The present invention addresses the aforementioned need in the art by the discovery of methods for reducing an amount of glycidol, glycidyl ester, or both glycidol and glycidyl ester within a triglyceride-containing composition, wherein the methods provide an effective, environmentally-friendly method without the shortcomings of previously known methods. The methods of the present invention advantageously (1) require much lower processing temperatures, (2) require shorter processing time, (3) do not increase free fatty acid content of edible oils, and (4) do not result in any significant oxidation as measured by the p-anisidine value and/or the peroxide value of the treated triglyceride-containing composition (e.g., a treated edible oil).

Accordingly, the present invention provides methods for reducing the amount of glycidol, glycidyl ester, or both glycidol and glycidyl ester within a triglyceride-containing composition. In some embodiments, the method for reducing an amount of glycidol, glycidyl ester, or both glycidol and glycidyl ester within a triglyceride-containing composition comprises: contacting the triglyceride-containing composition with an effective amount of silica-zirconia catalyst to reduce the amount of (i) glycidol, (ii) glycidyl ester, or (iii) both glycidol and glycidyl ester in the composition, wherein the amount of (i) glycidol, (ii) glycidyl ester, or (iii) both glycidol and glycidyl ester is reduced without affecting other components of the composition comprising the triglyceride (i.e., without increasing a free fatty acid content of the triglyceride-containing composition, and without any significant oxidation of the triglyceride-containing composition as measured by the p-anisidine value and/or the peroxide value of the treated triglyceride-containing composition).

In some embodiments, the method advantageously uses a relatively short reaction time (e.g., less than or up to 60 minutes) and a relatively low reaction temperature (e.g., typically from room temperature up to about 100° C.). The method may further comprise heating the triglyceride-containing composition and the silica-zirconia particles, so as to more effectively reduce the glycidol, the glycidyl ester, or both the glycidol and the glycidyl ester using the disclosed silica-zirconia catalysts. Unexpectedly, it has been found that the incorporation of an effective amount of the disclosed silica-zirconia catalyst particles provides superior catalytic activity in reducing glycidol, glycidyl ester, or both glycidol and glycidyl ester present in a triglyceride-containing composition (e.g., an edible oil).

In some desired embodiments, the method for reducing an amount of glycidol, the glycidyl ester, or both the glycidol and the glycidyl ester within a triglyceride-containing edible oil provides an edible oil, desirably, with a low level of glycidyl esters, i.e. less than 0.2 ppm, and with little to no change in (i) an initial free fatty acid content of the edible oil (as measured by the content of oleic acid) or (ii) an initial lipid oxidation level of the edible oil as measured by (a) p-anisidine value of the edible oil as measured by American Oil Chemists' Society (AOCS) Official Method Cd 18-90, (b) peroxide value of the edible oil as measured by AOCS Official Method Cd 8-53, or (c) both (a) and (b).

The present invention is further directed to a silica-zirconia catalyst suitable for use in the disclosed methods of reducing an amount of glycidol, the glycidyl ester, or both the glycidol and the glycidyl ester within a triglyceride-containing composition. The silica-zirconia catalyst comprises porous silica particles impregnated with zirconia. In some embodiments, the zirconia is impregnated onto at least a portion of the surface of the porous silica particles. In some embodiments, the zirconia is impregnated in at least a portion of the pores of the porous silica particles. In some embodiments, the zirconia is impregnated so as to be located substantially in the pores of the porous silica particles. Typically, the silica-zirconia particulate catalyst comprise at least 0.01 weight percent (wt %) of zirconia based on a total weight of the silica-zirconia particles. More typically, the silica-zirconia particulate catalyst comprise from about 1.0 wt % to about 50.0 wt % of zirconia based on a total weight of the catalyst.

The present invention is further directed to methods of making the herein-disclosed silica-zirconia particulate catalyst. In some embodiments, the method of making silica-zirconia catalyst comprises: impregnating porous silica particles with zirconium acetate in acetic acid with water; drying the impregnated porous silica particles for a time and at a temperature sufficient to dry the impregnated porous silica particles, i.e., at about 80° C. to about 150° C. for about 1 hour to about 4 hours; and calcining the dried zirconia impregnated porous silica particles at temperature ranging from about 400 to about 1000° C. for about 2 hours to about 8 hrs.

The present invention is further directed to compositions comprising (i) a triglyceride-containing composition and (ii) the herein-disclosed silica-zirconia particulate catalyst. In some embodiments, the composition comprises (i) an oil and (ii) the herein-disclosed silica-zirconia catalyst. The composition may further comprise glycidol, the glycidyl ester, or both the glycidol and the glycidyl ester (i.e., the composition prior to being subjected to the herein-disclosed method of reducing an amount of glycidol, the glycidyl ester, or both the glycidol and the glycidyl ester) or may have a minimal or negligible amount of glycidol, the glycidyl ester, or both the glycidol and the glycidyl ester (i.e., the composition after being subjected to the herein-disclosed method of reducing an amount of glycidol, the glycidyl ester, or both the glycidol and the glycidyl ester). In some desired embodiments, the triglyceride-containing composition is an oil, in particular, an edible oil such as soybean oil or palm oil or the like.

These and other features and advantages of the present invention will become apparent after a review of the following detailed description of the disclosed embodiments and the appended claims.

DETAILED DESCRIPTION

To promote an understanding of the principles of the present invention, descriptions of specific embodiments of the invention follow and specific language is used to describe the specific embodiments. It will nevertheless be understood that no limitation of the scope of the invention is intended by the use of specific language. Alterations, further modifications, and such further applications of the principles of the present invention discussed are contemplated as would normally occur to one ordinarily skilled in the art to which the invention pertains.

It must be noted that as used herein and in the appended claims, the singular forms "a", "and", and "the" include plural referents unless the context clearly dictates otherwise. Thus, for example, reference to "an oxide" includes a plurality of such oxides and reference to "oxide" includes reference to one or more oxides and equivalents thereof known to those skilled in the art, and so forth.

"About" modifying, for example, the quantity of an ingredient in a coated particle and/or composition, concentrations, volumes, process temperatures, process times, recoveries or yields, flow rates, and like values, and ranges thereof, employed in describing the embodiments of the disclosure, refers to variation in the numerical quantity that may occur, for example, through typical measuring and handling procedures; through inadvertent error in these procedures; through differences in the ingredients used to carry out the methods; and like proximate considerations. The term "about" also encompasses amounts that differ due to aging of a formulation with a particular initial concentration or mixture, and amounts that differ due to mixing or processing a formulation with a particular initial concentration or mixture. Whether modified by the term "about", the claims appended hereto include equivalents.

As used herein, the term "triglyceride-containing composition" (also referred to herein as "a composition comprising a triglyceride") is preferably any liquid containing one or more triglycerides, and optionally, one or more additional composition components. In some embodiments of the present invention, the glycidol, the glycidyl ester, or both the glycidol and the glycidyl ester are present within an edible oil such as soybean oil.

As used herein, the term "crystalline" means a solid material whose constituent atoms, molecules, or ions are arranged in an ordered pattern extends in all three directions, which may be measured by X-ray diffraction or differential scanning calorimetry. As used herein, the term "amorphous" means a solid material whose constituent atoms, molecules, or ions are arranged in a random, non-ordered pattern extends in all three directions, which may be determined by X-ray diffraction or differential scanning calorimetry.

As used herein, the term "BET particle surface area" is defined as meaning a particle surface area as measured by the Brunauer Emmet Teller (BET) nitrogen adsorption method.

As used herein, the phrase "total pore volume" refers to the median pore volume of a plurality of particles (e.g., the herein disclosed silica-zirconia particles) as determined using the Barrett-Joyner-Halenda (BJH) nitrogen porosimetry as described in DIN 66134.

As used herein, the phrase "particle size" refers to median particle size (D50, which is a volume distribution with 50 volume percent of the particles are smaller than this number and 50 volume percent of the particles are bigger than this number in size) measured by dynamic light scattering when the particles are slurried in water or an organic solvent such as acetone or ethanol.

Methods of Using Silica-Zirconia Catalysts

The present invention is directed to methods for reducing an amount of glycidol, glycidyl ester, or both glycidol and glycidyl ester within a triglyceride-containing composition. The method may comprise, for example, contacting the triglyceride-containing composition with an effective amount of silica-zirconia catalyst for a time and at a temperature sufficient to reduce the amount of glycidol, glycidyl ester, or both. The method may further comprise mixing the triglyceride-containing composition and the silica-zirconia catalyst under vacuum or an inert gas with optional heating. The method typically reduces at least 50 weight percent (wt %) of the amount of glycidol, glycidyl ester, or both glycidol and glycidyl ester, within a given triglyceride-containing composition, while utilizing a relatively low reaction time and temperature. For example, the reaction time and temperature may be as little as 60 minute at a reaction temperature of less than about 100° C.

In some embodiments, the disclosed methods for reducing an amount of glycidol, glycidyl ester, or both glycidol and glycidyl ester within a triglyceride-containing composition comprise contacting the triglyceride-containing composition with an effective amount of catalyst at room temperature although other temperatures could be used (e.g., preferably, from room temperature, about 20-25° C., up to about 90.0° C.).

Typically, a heating step, when used in the disclosed methods, comprises heating the triglyceride-containing composition and the silica-zirconia catalyst up to a temperature of at least about 40.0° C. In some embodiments, the heating step, when used in the disclosed methods, comprises heating the triglyceride-containing composition and the silica-zirconia catalyst up to a temperature of about 90.0° C. Typically, the heating step comprises heating the triglyceride-containing composition and the silica-zirconia catalyst up to a temperature between about 20.0° C. and about 90.0° C. (or any range of temperatures between about 20.0° C. and about 90.0° C., in increments of 0.1° C., e.g., from about 20.1° C. to about 89.9° C.).

Regardless of the uppermost temperature reached during the optional heating step (e.g., about 90.0° C.), the heating step, when used, desirably comprises heating the triglyceride-containing composition and the silica-zirconia catalyst up to a temperature of about 90.0° C.; and maintaining the temperature for at least 10.0 minutes. In some embodiments, the heating step comprises heating the triglyceride-containing composition and the silica-zirconia catalyst up to the uppermost temperature (e.g., about 90.0° C.); and maintaining the uppermost temperature for about 30.0 minutes. It should be understood that, in the disclosed methods, the uppermost temperature (e.g., about 90.0° C.) of the optional heating step can be maintained at the uppermost temperature (e.g., about 90.0° C.) for any desired amount of time, for example, from about 5.0 minutes to about 60.0 minutes (or any range of number of minutes between about 5.0 minutes and about 60.0 minutes, in increments of 0.1 minutes, e.g., from about 5.1 minutes to about 59.9 minutes).

Desirably, the heating step, when used in the disclosed methods, comprises heating the triglyceride-containing composition and the silica-zirconia catalyst (i) under an inert gas flow (i.e., under an inert gas blanket), (ii) under a vacuum, or (iii) both (i) under an inert gas flow and (ii) under a vacuum. Typically, the inert gas, when used, comprises nitrogen, argon, carbon dioxide, or any combination thereof.

The disclosed methods for reducing an amount of glycidol, glycidyl ester, or both glycidol and glycidyl ester within a triglyceride-containing composition are particularly useful when the triglyceride-containing composition comprises (i) a triglyceride-based oil, (ii) an organic solvent capable of dissolving triglycerides, or (iii) both a triglyceride-based oil and an organic solvent capable of dissolving triglycerides. Suitable oils include, but are not limited to, soybean oil, palm oil, corn oil, canola oil, rapeseed oil, fish oil, algal oil, sunflower oil, olive oil, vegetable oil, plant-derived oil, animal-derived oil, microbial-derived oil, or any combination thereof. Suitable organic solvents include, but are not limited to, heptane, hexane, toluene, diethyl ether, an alcohol, or any combination thereof.

In some desired embodiments, the disclosed methods for reducing an amount of glycidol, glycidyl ester, or both glycidol and glycidyl ester within a triglyceride-containing composition is particularly useful when the triglyceride-containing composition comprises an edible oil such as soybean oil or palm oil.

Typically, the disclosed methods for reducing an amount of glycidol, glycidyl ester, or both glycidol and glycidyl ester within a triglyceride-containing composition comprises using an effective amount of silica-zirconia catalyst of at least about 0.01 wt % of the silica-zirconia catalyst based on a total weight of the silica-zirconia catalyst and the triglyceride-containing composition. In some embodiments, the amount of silica-zirconia catalyst used in the disclosed methods is from about 0.5 wt % to about 10.0 wt % of the silica-zirconia catalyst based on a total weight of the silica-zirconia catalyst and the triglyceride-containing composition. In other embodiments, the amount of silica-zirconia catalyst used in the disclosed methods is from about 1.0 wt % to about 3.0 wt % of the silica-zirconia catalyst based on a total weight of the silica-zirconia catalyst and the triglyceride-containing composition. However, it should be understood that any amount of silica-zirconia catalyst may be used in the disclosed methods for reducing an amount of glycidol, glycidyl ester, or both glycidol and glycidyl ester within a triglyceride-containing composition, for example, any amount from about 0.5 wt % to about 10.0 wt % (or any range of weight percents between about 0.5 wt % and about 10.0 wt %, in increments of 0.1 wt %, e.g., from about 0.6 wt % to about 9.9 wt %) of the silica-zirconia catalyst based on a total weight of the silica-zirconia catalyst and the triglyceride-containing composition.

Unexpectedly, it has been determined that the disclosed methods for reducing an amount of glycidol, glycidyl ester, or both glycidol and glycidyl ester within a triglyceride-containing composition are capable of reducing the amount of glycidol, glycidyl ester, or both glycidol and glycidyl ester within a triglyceride-containing composition to a level of less than about 10.0 parts per million (ppm) of the glycidol, the glycidyl ester, or both the glycidol and the glycidyl ester in the triglyceride-containing composition. In some embodiments, the disclosed methods are capable of reducing the amount of glycidol, glycidyl ester, or both glycidol and glycidyl ester within a triglyceride-containing composition to a level of less than about 5.0 ppm of the glycidol, the glycidyl ester, or both the glycidol and the glycidyl ester in the triglyceride-containing composition. In other embodiments, the disclosed methods are capable of reducing the amount of glycidol, glycidyl ester, or both glycidol and glycidyl ester within a triglyceride-containing composition to a level of less than about 1.0 ppm of the glycidol, the glycidyl ester, or both the glycidol and the glycidyl ester in the triglyceride-containing composition. In other embodiments, the disclosed methods are capable of reducing the amount of glycidol, glycidyl ester, or both glycidol and glycidyl ester within a triglyceride-containing composition to a level of less than about 0.5 ppm of the glycidol, the glycidyl ester, or both the glycidol and the glycidyl ester in the triglyceride-containing composition. In yet other embodiments, the disclosed methods are capable of reducing the amount of glycidol, glycidyl ester, or both glycidol and glycidyl ester within a triglyceride-containing composition to a level of less than about 0.2 ppm of the glycidol, the glycidyl ester, or both the glycidol and the glycidyl ester in the triglyceride-containing composition.

Unexpectedly, it has been determined that the disclosed methods for reducing an amount of glycidol, glycidyl ester, or both glycidol and glycidyl ester within a triglyceride-containing composition are capable of reducing at least 50 weight percent (wt %) of the amount of glycidol, glycidyl ester, or both glycidol and glycidyl ester within a triglyceride-containing composition within the above-described reaction parameters (i.e., a reaction temperature of from room temperature to less than about 100° C., and/or a reaction time of up to about 60 minutes). In some embodiments, the method reduces at least 80.00 wt % of the amount of glycidol, glycidyl ester, or both glycidol and glycidyl ester within a triglyceride-containing composition. In some embodiments, the disclosed methods are capable of reducing up to about 99.99 wt % of the amount of glycidol, glycidyl ester, or both glycidol and glycidyl ester within a triglyceride-containing composition (or any range of weight percents between about 50.00 wt % and 99.99 wt % in increments of 0.01 wt %, e.g. from about 50.01 wt % to 99.98 wt %) within the above-described reaction parameters (i.e., a reaction temperature of from room temperature to less than about 100° C., and/or a reaction time of up to about 60 minutes).

In addition, and unexpectedly, the disclosed methods for reducing an amount of glycidol, glycidyl ester, or both glycidol and glycidyl ester within a triglyceride-containing composition are capable of reducing the amount of glycidol, glycidyl ester, or both glycidol and glycidyl ester within a triglyceride-containing composition to extremely low levels, as discussed above, without negatively impacting a free fatty acid content of the given triglyceride-containing composition. In some embodiments, the given triglyceride-containing composition (e.g., soybean oil or palm oil) has a free fatty acid content prior to contact with the silica-zirconia catalyst of the present invention, and the disclosed method comprising, inter alia, contacting the triglyceride-containing composition (e.g., soybean oil or palm oil) with the silica-zirconia catalyst, has a negligible change on the free fatty acid content (i.e., as oleic acid) of the triglyceride-containing composition, as measured by AOCS Official Method Ca 5a-40.

In some desired embodiments of the present, the method for reducing an amount of glycidol, glycidyl ester, or both glycidol and glycidyl ester within a triglyceride-containing composition comprises a method of producing an edible oil with a level of glycidol and/or glycidyl esters of less than 0.2 ppm and little to no change in (i) a free fatty acid content of the edible oil (i.e., as oleic acid) and/or (ii) an oxidation level of the edible oil as measured by (a) the p-anisidine value of the edible oil as measured, for example, by AOCS Official Method Cd 18-90, (b) the peroxide value of the edible oil as measured, for example, by AOCS Official Method Cd 8-53, or (c) both (a) and (b).

In some embodiments, the disclosed methods of producing an edible oil (e.g., with a level of glycidol and/or glycidyl esters of less than 0.2 ppm) changes an initial free fatty acid content of the edible oil (i.e., as measured as content of oleic acid) by less than about 20%. In other embodiments, the disclosed methods of producing an edible oil (e.g., with a level of glycidol and/or glycidyl esters of less than 0.2 ppm) changes an initial free fatty acid content of the edible oil (i.e., as measured as content of oleic acid) by less than about 10%.

As discussed in AOCS Official Method Cd 18-90, the subject matter of which is incorporated herein in its entirety, the lipid oxidation level of a given edible oil may be measured by the p-anisidine value of the edible oil. Processing of edible oils can result in an undesirable series of chemical reactions involving oxygen that degrades the quality of the edible oil. Such undesirable oxidation reactions can generate, for example, primary oxidation products such as peroxides, dienes, free fatty acids, etc., and secondary products such as carbonyls, aldehydes, trienes, etc. The p-anisidine value of the edible oil measures an amount of aldehyde within the edible oil.

In some embodiments, the disclosed method of producing an edible oil with a level of glycidyl esters of less than 0.2 ppm changes an initial p-anisidine value of the edible oil by less than about 10.0 units. In other embodiments, the disclosed method of producing an edible oil with a level of glycidyl esters of less than 0.2 ppm changes an initial p-anisidine value of the edible oil by less than about 1.0 units. In other embodiments, the disclosed method of producing an edible oil with a level of glycidyl esters of less than 0.2 ppm changes an initial p-anisidine value of the edible oil by less than about 0.2 units.

The oxidation level of a given edible oil may also be measured by the peroxide value of the edible oil as measured by AOCS Official Method Cd 8-53. As discussed in AOCS Official Method Cd 8-53, the subject matter of which is incorporated herein in its entirety, the peroxide value provides a measure of the amount of peroxides within a given edible oil.

In some embodiments, the disclosed method of producing an edible oil with a level of glycidyl esters of less than 0.2 ppm changes an initial peroxide value of the edible oil by less than about 10.0 units. In other embodiments, the disclosed method of producing an edible oil with a level of glycidyl esters of less than 0.2 ppm changes an initial peroxide value of the edible oil by less than about 7.0 units. In other embodiments, the disclosed method of producing an edible oil with a level of glycidyl esters of less than 0.2 ppm changes an initial peroxide value of the edible oil by less than about 2.0 units.

Typically, edible oil is subjected to a refined-bleached-deodorized (RBD) treatment. In conventional methods of producing edible oils, after the RBD treatment, edible oils are subjected to further processing prior to use. The further processing of conventionally-prepared edible oil (i.e., not treated using the herein-described methods) includes, but is not limited to, contacting the oil with an enzyme, shear mixing the oil with an acid, rebleaching the oil, and/or rerunning the deodorization at a lower temperature but for an extended period of time, or any combination of the process steps mentioned. However, edible oils subjected to a RBD treatment and subsequently treated using the herein-described methods of producing an edible oil with a level of glycidol and/or glycidyl esters of less than 0.2 ppm, typically do not require further processing prior to use (i.e., do not require further processing including, but not limited to, contacting the oil with an enzyme, shear mixing the oil with an acid, rebleaching the oil, and/or rerunning the deodorization at a lower temperature but for an extended period of time, or any combination of the process steps mentioned).

Silica-Zirconia Catalysts Used in the Herein-Described Methods

The silica-zirconia catalyst used in the herein-described methods comprise porous silica particles impregnated with zirconia. As discussed above, in some embodiments, the zirconia is impregnated onto at least a portion of the surface of the porous silica particles. In some embodiments, the zirconia is impregnated in at least a portion of the pores of the porous silica particles. In some embodiments, the zirconia is impregnated so as to be located substantially in the pores of the porous silica particles.

Suitable porous silica particles useful in the preparation of the silica-zirconia catalysts of the present invention include, but are not limited to, silica gel, precipitated silica, fumed silica and colloidal silica. Suitable porous silica also includes, but is not limited to, ordered mesoporous silica prepared through an organic template (e.g., a surfactant) during the formation of silica particles, followed by a high temperature treatment to "burn off" the organics. Particularly preferred porous silica particles comprise silica gel or precipitated silica particles.

Any commercially available porous silica particles may be used to form the silica-zirconia catalysts of the present invention. Commercially available porous silica particles useful for forming the silica-zirconia catalysts of the present invention include, but are not limited to, particles available from W.R. Grace (Columbia, MD) under the trade designation SYLOID® such as SYLOID® C807 silica gel particles and SYLOID® MX106 precipitated silica particles, SYLOBLOC® silica particles, and DARACLAR® silica particles.

The porous silica particles used to form the silica-zirconia catalysts of the present invention comprise porous silica having a purity of at least about 93.0% by weight $SiO_2$, or at least about 93.5% by weight $SiO_2$, at least about 94.0% by weight $SiO_2$, at least about 95.0% by weight $SiO_2$, at least about 96.0% by weight $SiO_2$, at least about 97.0% by weight $SiO_2$, or at least about 98.0% by weight $SiO_2$ up to 100% by weight $SiO_2$ based upon the total weight of the porous silica particle.

The porous silica particles used to form the silica-zirconia catalysts of the present invention may have a variety of different symmetrical, asymmetrical or irregular shapes, including chain, rod or lath shape. The porous silica particles may have different structures including amorphous or crystalline, etc. In a preferred embodiment, the porous silica particles are amorphous. The porous silica particles may include mixtures of particles comprising different compositions, sizes, shapes or physical structures, or that may be the same except for different surface treatments. Porosity of the porous silica particles may be intraparticle or interparticle in cases where smaller particles are agglomerated to form larger particles.

Typically, the silica-zirconia catalyst (and independently the porous silica particles used to form the silica-zirconia particles) have a median particle size of from about 0.1 micron (μm) to about 10,000 μm (or any range of median particle size between about 0.1 μm and about 10,000 μm, in increments of 0.1 μm, e.g., from about 0.2 μm to about 9,999.9 μm). In some embodiments, the silica-zirconia particles (and independently the porous silica particles used to form the silica-zirconia particles) used in the herein-described methods have a median particle size of from about 80.0 μm to about 400 μm. In some embodiments, the silica-zirconia particles (and independently the porous silica particles used to form the silica-zirconia particles) used in the herein-described methods have a median particle size of from about 100.0 μm to about 200 μm.

The silica-zirconia catalyst (and independently the porous silica particles used to form the silica-zirconia catalyst) used in the herein-described methods typically have a pore volume of at least 0.01 cubic centimeters/gram (cc/g) as determined by Barrett-Joyner-Halenda (BJH) method. More typically, the silica-zirconia catalyst (and independently the porous silica particles used to form the silica-zirconia catalyst) have a pore volume of at least 0.5 cc/g as determined by Barrett-Joyner-Halenda (BJH) method. In some embodiments, the silica-zirconia catalyst (and independently the porous silica particles used to form the silica-zirconia catalyst) have a pore volume of from about 0.5 cc/g to about 3.0 cc/g, or greater as determined by Barrett-Joyner-Halenda (BJH) method. However, it should be understood that the silica-zirconia catalyst (and independently the porous silica particles used to form the silica-zirconia catalyst) used in the herein-described methods may have a pore volume of from about 0.01 cc/g to about 3.00 cc/g (or greater) as determined by Barrett-Joyner-Halenda (BJH) method (or any range of pore volume between about 0.01 cc/g and about 3.0 cc/g, in increments of 0.01 cc/g, e.g., from about 0.02 cc/g to about 2.99 cc/g).

The silica-zirconia catalyst (and independently the porous silica particles used to form the silica-zirconia catalyst) used in the herein-described methods may also have a median pore diameter of at least 0.1 nanometers (nm) as determined by a mercury intrusion test procedure using an Autopore IV 9520 available from Micromeritics Instrument Corp. Typically, the silica-zirconia catalyst (and independently the porous silica particles used to form the silica-zirconia catalyst) used in the herein-described methods have an average pore diameter of from about 1.0 nm to about 1,000.0 nm. In some embodiments, the silica-zirconia catalyst (and independently the porous silica particles used to form the silica-zirconia catalyst) used in the herein-described methods have an average pore diameter of from about 1.0 nm to about 100.0 nm. In other embodiments, the silica-zirconia catalyst (and independently the porous silica particles used to form the silica-zirconia catalyst) used in the herein-described methods have an average pore diameter of from about 2.0 nm to about 50.0 nm. However, it should be understood that the silica-zirconia catalyst (and independently the porous silica particles used to form the silica-zirconia catalyst) used in the herein-described methods may have an average pore diameter ranging from about 0.1 nm to about 1,000.0 nm (or greater) (or any range of average pore diameter between about 0.1 nm and about 1,000.0 nm, in increments of 0.1 nm, e.g., from about 0.2 nm to about 999.9 nm).

The silica-zirconia catalyst (and independently the porous silica particles used to form the silica-zirconia catalyst) used in the herein-described methods may also have a BET particle surface area of at least about 10 m$^2$/g up to about 2000 m$^2$/g, or greater. Typically, the silica-zirconia catalyst (and independently the porous silica particles used to form the silica-zirconia catalyst) used in the herein-described methods have a BET particle surface area of at least about 25.0 m$^2$/g. In some embodiments, the silica-zirconia catalyst (and independently the porous silica particles used to form the silica-zirconia catalyst) have a BET particle surface area of at least about 50 m$^2$/g up to about 800 m$^2$/g. However, it should be understood that the silica-zirconia catalyst (and independently the porous silica particles used to form the silica-zirconia catalyst) used in the herein-described methods can have any BET particle surface area ranging from about 10 m$^2$/g to about 2000 m$^2$/g, or greater (or any range of BET particle surface area values between about 10 m$^2$/g and about 2000 m$^2$/g, in increments of 0.1 m$^2$/g, e.g., from about 10.1 m$^2$/g to about 1999.9 m$^2$/g).

The silica-zirconia catalyst (and independently the porous silica particles used to form the silica-zirconia catalyst) used in the herein-described methods may also be subjected to size reduction. Any known method of reducing the particle size may be used, and include, but are not limited to, a milling step such as ball mill or a mortar pestle grinding step.

The silica-zirconia catalyst (and independently the porous silica particles used to form the silica-zirconia catalyst) used in the herein-described methods may comprise (i) any of the above-described porous silica particles in combination with (ii) zirconia. As discussed above, the zirconia may be impregnated (i) on at least a portion of the particle surfaces of the porous silica particles, or (ii) within at least a portion of the pores of the porous silica particles, or (iii) on at least a portion of the surface of the porous silica particles and within at least a portion of pores of the porous silica particles, or (iv) substantially within the pores of the porous silica particles. In one embodiment, the zirconia is located substantially within the pores of the silica particles.

Typically, the silica-zirconia catalyst used in the herein-described methods comprise at least about 0.01 weight percent (wt %) of zirconia based on a total weight of the silica-zirconia catalyst. In some embodiments, the silica-zirconia catalyst used in the herein-described methods comprise from about 1.0 wt % to about 50.0 wt % of zirconia based on a total weight of the silica-zirconia catalyst. In some desired embodiments, the silica-zirconia catalyst used in the herein-described methods comprise from about 1.5 wt % to about 14.3 wt % of zirconia based on a total weight of the silica-zirconia catalyst. In other desired embodiments, the silica-zirconia catalyst used in the herein-described methods comprise from about 2.4 wt % to about 5.0 wt % of zirconia based on a total weight of the silica-zirconia catalyst. However, it should be understood that the silica-zirconia catalyst used in the herein-described methods may comprise any amount of zirconia ranging from about 0.01 wt % to about 50.0 wt % (or greater) (or any range of amounts of zirconia between about 0.01 wt % and about 50.0 wt %, in increments of 0.01 wt %, e.g., from about 0.02 wt % to about 49.99 wt %, based on a total weight of the silica-zirconia catalyst).

In some desired embodiments, the silica-zirconia catalyst of the present invention (i) have a median particle size of from about 80.0 µm to about 400 µm; (ii) have a pore volume of from about 0.5 cc/g to about 3.0 cc/g, or greater as determined by Barrett-Joyner-Halenda (BJH) method; (iii) have an average pore diameter of from about 1.0 nm to about 100.0 nm; (iv) have a BET particle surface area of at least about 50.0 m$^2$/g up to about 800 m$^2$/g; and (v) comprise from about 1.0 wt % to about 50.0 wt % of zirconia based on a total weight of the silica-zirconia catalyst.

In other desired embodiments, the silica-zirconia catalyst of the present invention (i) have a median particle size of from about 100.0 µm to about 200 µm; (ii) have a pore volume of from about 1.0 cc/g to about 2.0 cc/g, as determined by Barrett-Joyner-Halenda (BJH) method; (iii) have an average pore diameter of from about 15.0 nm to about 30.0 nm; (iv) have a BET particle surface area of at least about 75.0 m$^2$/g up to about 400 m$^2$/g; and (v) comprise from about 2.5 wt % to about 15.0 wt % of zirconia based on a total weight of the silica-zirconia catalyst.

Methods of Making Silica-Zirconia Catalysts Used in the Herein-Described Methods The silica-zirconia catalyst used in the herein-described methods may be formed by a zirconia coating and/or impregnation step, followed by one or more additional steps such as a drying step, a calcining step, or both. In some embodiments, the method of making silica-zirconia catalyst, suitable for use in the herein-described methods, comprises impregnating porous silica particles with zirconium acetate in acetic acid with water; drying the impregnated porous silica particles at about 105° C. for about 2 hours; and calcining the dried impregnated porous silica particles at about 500° C. for about 4 hours.

Typically, the method of making silica-zirconia catalyst comprises an impregnating step that allows contact between the porous silica particles and the zirconium acetate for a desired period of time. In some embodiments, the impregnating step allows contact between the porous silica particles and the zirconium acetate for a period of time of about 30 minutes. However, it should be understood that the impregnation step may allow for contact between the porous silica particles and the zirconium acetate for any desired period of time.

In some desired embodiments, after the impregnating step and before the drying step, the method of making silica-zirconia catalyst comprises allowing the impregnated porous silica particles to mill for about 60 minutes. It should be understood that the impregnated porous silica particles may mill (or be milled) for any desired period of time.

Compositions Used in and Produced by the Herein-Described Methods

The present invention is further directed to triglyceride-containing compositions comprising the herein-described silica-zirconia catalyst. As discussed above, typically, a given triglyceride-containing composition (i.e., prior to or after the above described methods for reducing an amount of glycidol, glycidyl ester, or both glycidol and glycidyl ester within a triglyceride-containing composition and/or methods of producing an edible oil, prior to removal of the silica-zirconia catalyst) comprises an amount greater than about 0.01 wt %, typically from about 0.50 wt % to about 10.0 wt % (or any range of weight percents between about 0.50 wt % and about 10.00 wt %, in increments of 0.01 wt %, e.g., from about 1.00 wt % to about 3.00 wt %) of the herein-described silica-zirconia catalyst based on a total weight of the silica-zirconia catalyst and the triglyceride-containing composition. As discussed above, in some desired embodiments, the triglyceride-containing composition of the present invention comprises the herein-described silica-zirconia catalyst in an oil (e.g., an edible oil such as soybean oil or palm oil) or an organic solvent (e.g., a triglyceride-dissolving solvent such as toluene) (i.e., prior to or after the above described methods for reducing an amount of glycidol, glycidyl ester, or both glycidol and glycidyl ester within a triglyceride-containing composition and/or methods of producing an edible oil, prior to removal of the silica-zirconia catalyst). In some desired embodiments, the triglyceride-containing composition of the present invention comprises the herein-described silica-zirconia catalyst in an edible oil (e.g., soybean oil or palm oil) (i.e., prior to or after the above described methods for reducing an amount of glycidol, glycidyl ester, or both glycidol and glycidyl ester within a triglyceride-containing composition and/or methods of producing an edible oil, prior to removal of the silica-zirconia catalyst).

The present invention is further directed to oils and triglyceride-containing compositions resulting from the above described methods for reducing an amount of glycidol, glycidyl ester, or both glycidol and glycidyl ester within a triglyceride-containing composition and/or methods of producing an edible oil, prior to or after removal of the silica-zirconia catalyst. In some desired embodiments, the disclosed methods are used to produce an edible oil.

It should be understood that although the above-described silica-zirconia catalysts, methods and uses are described as "comprising" one or more components or steps, the above-described silica-zirconia catalysts, methods and uses may "comprise," "consists of," or "consist essentially of" any of the above-described components or steps of the silica-zirconia catalysts, methods and uses. Consequently, where the present invention, or a portion thereof, has been described with an open-ended term such as "comprising," it should be readily understood that (unless otherwise stated) the description of the present invention, or the portion thereof, should also be interpreted to describe the present invention, or a portion thereof, using the terms "consisting essentially of" or "consisting of" or variations thereof as discussed below.

As used herein, the terms "comprises," "comprising," "includes," "including," "has," "having," "contains", "containing," "characterized by" or any other variation thereof, are intended to encompass a non-exclusive inclusion, subject to any limitation explicitly indicated otherwise, of the recited components. For example, a silica-zirconia catalyst, method and/or use that "comprises" a list of elements (e.g., components or steps) is not necessarily limited to only those elements (or components or steps), but may include other elements (or components or steps) not expressly listed or inherent to the silica-zirconia catalyst, method and/or use.

As used herein, the transitional phrases "consists of" and "consisting of" exclude any element, step, or component not specified. For example, "consists of" or "consisting of" used in a claim would limit the claim to the components, materials or steps specifically recited in the claim except for impurities ordinarily associated therewith (i.e., impurities within a given component). When the phrase "consists of" or "consisting of" appears in a clause of the body of a claim, rather than immediately following the preamble, the phrase "consists of" or "consisting of" limits only the elements (or components or steps) set forth in that clause; other elements (or components) are not excluded from the claim as a whole.

As used herein, the transitional phrases "consists essentially of" and "consisting essentially of" are used to define silica-zirconia catalysts, methods and/or uses that include materials, steps, features, components, or elements, in addition to those literally disclosed, provided that these additional materials, steps, features, components, or elements do not materially affect the basic and novel characteristic(s) of the claimed invention. The term "consisting essentially of" occupies a middle ground between "comprising" and "consisting of".

The present invention is further illustrated by the following examples, which are not to be construed in any way as imposing limitations upon the scope thereof. On the contrary, it is to be clearly understood that resort may be had to various other embodiments, modifications, and equivalents thereof which, after reading the description herein, may suggest themselves to those skilled in the art without departing from the spirit of the present invention and/or the scope of the appended claims.

EXAMPLES

The following examples describe (i) processes in accordance with the present invention for preparing silica-zirconia catalyst, and (ii) the evaluation of the silica-zirconia catalyst in reducing an amount of glycidol, glycidyl ester, or both glycidol and glycidyl ester within various triglyceride-containing compositions.

Nitrogen Pore Volume and BET Surface Area Measurements of Silica-Zirconia Particle Samples Nitrogen pore volumes of silica-zirconia catalyst were measured using an AUTOSORB® iQ analyzer, available from Quantachrome Instrument (Boynton Beach, FL). The degasing for each sample was carried out at 65° C. (i.e., below the melting temperature of the wax of around 80° C.) for 4 hours. Nitrogen adsorption and desorption isotherms were measured at 77K with nitrogen pressure increasing from 0.01% atmosphere to 0.998% atmosphere, and subsequently decreasing from 0.998% atmosphere to 0.025% atmosphere, respectively. The pore volumes were calculated using the ASIQWIN™ 5.0 version program based on BJH theory. See, for example, Barrett et al., *The Determination of Pore Volume and Area Distributions in Porous Substances. I. Computations from Nitrogen Isotherms, J. Am. Chem. Soc.*, 1951, 73 (1), pp 373-380, and the BET surface area were also calculations based on the the Brunauer Emmet Teller method (Brunauer, et al., "*Adsorption of Gases in Multimolecular Layers*". *J. Am. Chem. Soc.* 1938, 60 (2): 309-319), the subject matter of both of which is incorporated herein by reference in their entirety.

Total Glycidol Concentration Analysis

The total glycidol concentration of a given sample was determined using AOCS Official Method Cd 29c-13, the subject matter of which is hereby incorporated by reference in its entirety. This method determines a concentration of the sum of (i) the total free glycidol and (ii) bound glycidol (i.e., glycidyl esters) present in a given sample.

Catalyst Synthesis

The porous silica-zirconia catalyst particles were prepared using the following procedure. A desired amount of zirconium acetate was diluted in acetic acid with water, and used to impregnate the porous silica particles over the course of 30 minutes, and subsequently allowed to mill for an additional hour. The material was then dried at 105° C. for 2 hours, and then calcined at 500° C. for 4 hours.

The resulting silica-zirconia catalyst had a zirconia concentration ranging from 0.01 wt % to 49.99 wt %. As discussed further below, in some embodiments, silica-zirconia catalyst having a zirconia concentration ranging from about 2.00 wt % to about 20.00 wt % provided effective results. Final zirconia concentrations were determined using ICP elemental trace analysis.

Four sample silica-zirconia catalysts, catalysts A to D, were formed using the herein-described synthesis procedure. Properties of catalysts A to D are shown in Table 1 below.

TABLE 1

Properties of Sample Catalysts A to D

| Catalyst | Surface Area ($m^2/g$) | Pore Volume (cc/g) | Pore Diameter (A) | Particle Size (μm) | Zirconia (wt %) |
|---|---|---|---|---|---|
| A | 326 | 1.55 | 210 | 150 | 5.1 |
| B | 339 | 1.57 | 216 | 150 | 2.5 |
| C | 293 | 1.40 | 191 | 150 | 14.3 |
| D | 77 | 0.51 | 238 | 150 | 6.0 |

Reaction Procedure

Each oil/solvent was charged to a round bottom flask and spiked with glycidol and/or a glycidyl ester (e.g., glycidyl oleate). The overhead mixer was set to 250 rpm. The reactor was flushed with an inert gas, and then an initial sample was taken for GC/MS analysis. The desired catalyst amount of silica-zirconia catalyst was added, then the temperature was increased to the desired set point. After the desired amount of time, a final sample was taken, then filtered through a filter disc prior to analysis to remove the solid catalyst.

The reaction temperature is not limited, but is preferably about 45° C. to about 90° C. Regarding the edible oil industry, keeping the temperature below 90° C. helps prevent oil oxidation, but allows the glycidol and glycidyl esters to be reduced in a sufficient amount of time. Likewise, the reaction time is not limited, but is preferably less than 2 hours to minimize residency time within the refinery.

Example 1—Control Experiment

The reaction procedure described above was used in the following example. Soybean oil spiked with glycidyl oleate, was mixed and heated to an uppermost temperature of 90° C. under argon. The total glycidol concentration within the reaction mixture was measured over a 30 minute period as shown in Table 2 below.

TABLE 2

Control Experimental Results

| Reaction Time | Glycidol (ppm) |
|---|---|
| Spiked Soybean Oil | 22.35 |
| Heated to 90° C. | 22.58 |
| 15 minutes | 24.56 |
| 30 minutes | 23.12 |

As shown in Table 2, there is no glycidol/glycidyl oleate reduction without the catalyst added to the reaction mixture.

Example 2—Silica Zirconia Catalyst Dosage Effects into the Reaction Mixture

The catalyst synthesis and reaction procedure described above were used in the following example. Catalyst A of the present invention was added at 0.5, 1.0, 1.5, and 2.0 wt %, based on a total weight of the silica-zirconia catalyst and soybean oil, to soybean oil spiked with glycidyl oleate. The reaction mixtures were mixed and heated to an uppermost temperature of 90° C. under argon. The concentration of total glycidol within the reaction mixture was measured before and after a 30 minute period as shown in Table 3 below.

TABLE 3

Epoxide Reduction at Various Catalyst Dosages

| Catalyst Dosage wt % | Initial Glycidol (ppm) | Final Glycidol (ppm) |
|---|---|---|
| 0.5 | 9.79 | 1.62 |
| 1.0 | 10.24 | <LOQ |
| 1.5 | 10.38 | <LOQ |
| 2.0 | 17.90 | <LOQ |

The Limit of Quantification (LOQ) = 0.20 ppm

As shown in Table 3, a dosage of as little at 0.5 wt % silica-zirconia catalyst reduces glycidol/glycidyl oleate significantly within 30 minutes at 90° C. Likewise, increasing the silica-zirconia catalyst dosage improves glycidol/glycidyl oleate reduction in the reaction mixture over a set amount of time.

Example 3—Zirconia Concentration and its Effect on Total Glycidol Reduction

The catalyst synthesis and reaction procedure described above were used in the following example. Catalysts A, B, C, and D of the present invention were added to soybean oil spiked with glycidyl oleate. 2.0 wt % of the silica/zirconia catalyst was used, based on a total weight of the catalyst and the soybean oil. The reaction mixtures were mixed and heated to an uppermost temperature of 90° C. under argon. The concentration of total glycidol within the reaction mixture was measured before and after a 30 minute period as shown in Table 4 below.

TABLE 4

Glycidol Reduction at Various Zirconia Concentrations

| Catalyst | Initial Glycidol (ppm) | Final Glycidol (ppm) |
|---|---|---|
| A | 17.90 | <LOQ |
| B | 10.23 | 0.24 |
| C | 11.19 | <LOQ |
| D | 32.57 | <LOQ |

As shown in Table 4, increasing the zirconia concentration on the silica base, improves glycidol/glycidyl oleate reduction in the reaction mixture significantly.

Example 4—Reaction Temperature and its Effect on Total Glycidol Reduction

The catalyst synthesis and reaction procedure described above were used in the following example. Catalyst A of the present invention was added to soybean oil spiked with glycidyl oleate. 2.0 wt % of the silica/zirconia catalyst was used, based on a total weight of the catalyst and the soybean oil. The reaction mixtures were mixed and heated to an uppermost temperature of 23° C. (no heat added), 45° C., and 90° C. under argon. The concentration of total glycidol within the reaction mixture was measured before and after a 7 hour, 2 hour, and half hour period respectively as shown in Table 5 below.

TABLE 5

Glycidol Reduction at Various Temperatures

| Temperature | Reaction Time (hrs) | Initial Glycidol (ppm) | Final Glycidol (ppm) |
|---|---|---|---|
| Room | 7.0 | 20.00 | 1.24 |
| 45° C. | 2.0 | 23.65 | <LOQ |
| 90° C. | 0.5 | 17.90 | <LOQ |

As shown in Table 5, this catalytic reaction proceeds without any additional heat. Heating the mixture accelerates the reaction in true catalytic form, however excessive heat could cause more glycidol/glycidyl oleate to form. For example, it is previously known, in edible oil refining, that glycidyl esters form during the deodorization process at temperatures of 200□ or greater.

Example 5—Total Glycidol Reduction at 45° C. in Soybean Oil and its Effect on Oxidation The catalyst synthesis and reaction procedure described above were used in the following example. Catalyst A of the present invention was added to soybean oil spiked with glycidyl oleate. 2.0 wt % of the silica/zirconia catalyst was used, based on a total weight of the catalyst and the soybean oil. The reaction mixture was mixed and heated to an uppermost temperature of 45° C. under argon. The free fatty acid concentration (FFA %), p-anisidine value (p-AV), total glycidol concentration, and the peroxide value (PV) within the reaction mixture were measured over a 2 hour period as shown in Table 6 below.

TABLE 6

Soybean Oil Oxidation at 45° C.

| Reaction Time | FFA % | p-AV | PV | Glycidol (ppm) |
|---|---|---|---|---|
| Spiked Soybean Oil | 1.1 | 1.2 | 3.1 | 23.65 |
| 30 minutes | 1.1 | 1.0 | 1.5 | 3.57 |
| 2 hours | 1.2 | 1.1 | 1.1 | <LOQ |

As shown in Table 6, the free fatty acid concentration and the p-anisidine value did not change, while the peroxide value and total glycidol concentration decreased over the two hour reaction period. This reveals that no significant degradation occurs during this glycidol/glycidyl ester reducing reaction.

Example 6—Total Glycidol Reduction at 90° C. in Palm Oil and its Effect on Oxidation The catalyst synthesis and reaction procedure described above were used in the following example. Catalyst A of the present invention was added to palm oil spiked with glycidyl oleate. 2.0 wt % of the silica/zirconia catalyst was used, based on a total weight of the catalyst and the palm oil. The reaction mixture was mixed and heated to an uppermost temperature of 90° C. under argon. The free fatty acid concentration, p-anisidine (p-AV) value, the peroxide value (PV), and the concentration of total glycidol within the reaction mixture was measured over a 30 minute period as shown in Table 7 below.

TABLE 7

Total Glycidol Reduction and Oxidation in Palm Oil at 90° C.

| Reaction Time | FFA% | p-AV | PV | Glycidol (ppm) |
|---|---|---|---|---|
| Spiked Palm Oil | 1.0 | 4.6 | 7.7 | 27.04 |
| Heated to 90° C. | 0.9 | 4.4 | 5.2 | 10.62 |
| 15 minutes | 1.2 | 5.2 | 1.6 | 2.95 |
| 30 minutes | 0.9 | 5.6 | 1.3 | <LOQ |

As shown in Table 7, the free fatty acid concentration and the p-anisidine value did not significantly change, while the peroxide value and total glycidol content decreased over the thirty minute reaction period, with the final total glycidol content being less than a measurable amount. Palm oil is easily oxidized upon heating, explaining the small, yet insignificant, increase in p-AV. Solely reducing the reaction temperature will prevent secondary oxidation products from forming.

Example 7—Matrix/Solvent Effects on Glycidol Reduction

The catalyst synthesis and reaction procedure described above were used in the following example. Catalyst A of the present invention was added to the reaction matrix spiked with free glycidol. 2.0 wt % of the silica/zirconia catalyst was used, based on a total weight of the catalyst and the matrix/solvent. The reaction mixture was mixed and heated to an uppermost temperature of 90° C. under argon. The concentration of total glycidol within the reaction mixture was measured after a 30 minute period as shown in Table 8 below.

TABLE 8

Reaction Matrix Effects on Glycidol Reduction

| Reaction Matrix | Initial Glycidol (ppm) | Final Glycidol (ppm) |
|---|---|---|
| Spiked Soybean Oil | 76.05 | 0.21 |
| Spiked Toluene | 53.02 | <LOQ |

As shown in Table 8, the reaction proceeds in both edible oil and organic solvent matrices for reducing free glycidol in addition to glycidyl esters.

Comparative Example 8—Use of Commercially Available Silica/Zirconia Catalyst

The reaction procedure described above and commercially available, non-porous, silica/zirconia particles, purchased through Fisher Scientific, were used in the following example. One sample of 0.1 mm silica/zirconia beads was manufactured by Bio Spec Products (catalog number: NC0362415) and the other sample of 0.1 mm silica/zirconia beads was manufactured by Research Products International Corp (catalog number: 50212145). The commercially available silica/zirconia particles were added to soybean oil spiked with glycidyl oleate. 2.0 wt % of the silica/zirconia particles was used, based on a total weight of the particles and the soybean oil. The reaction mixture was mixed and heated to an uppermost temperature of 90° C. under argon. The p-anisidine (p-AV) value, the peroxide value (PV), and the concentration of total glycidol within the reaction mixture was measured before and after a 30 minute period as shown in Table 9 below.

TABLE 9

Total Glycidol Reduction and Oxidation with Commercially Available Silica/Zirconia Particles

| | Reaction Time | p-AV | PV | Epoxide (ppm) |
|---|---|---|---|---|
| Bio Spec | Spiked Soybean Oil | 1.1 | 2.84 | 25.56 |
| (29.2% Zirconia) | Heated to 90° C. | 1.2 | 3.09 | 22.11 |
| | 15 minutes | 1.5 | 3.19 | 24.68 |
| | 30 minutes | 1.3 | 3.06 | 24.61 |
| RPI Corp | Spiked Soybean Oil | 1.0 | 4.27 | 22.17 |
| (34.0% Zirconia) | Heated to 90° C. | 0.7 | 4.75 | 29.60 |
| | 15 minutes | 1.4 | 5.79 | 23.37 |
| | 30 minutes | 1.2 | 5.14 | 21.13 |

As shown in Table 9, commercially available non-porous silica/zirconia particles do not effectively reduce the total glycidol in a given reaction mixture compared to the silica/zirconia catalyst of the present invention described herein. In contrast to the silica/zirconia catalyst of the present invention disclosed herein, these commercially available silica/zirconia particles are nonporous and have a lower surface area.

While the invention has been described with a limited number of embodiments, these specific embodiments are not intended to limit the scope of the invention as otherwise described and claimed herein. It may be evident to those of ordinary skill in the art upon review of the exemplary embodiments herein that further modifications, equivalents, and variations are possible. All parts and percentages in the examples, as well as in the remainder of the specification, are by weight unless otherwise specified. Further, any range of numbers recited in the specification or claims, such as that representing a particular set of properties, units of measure, conditions, physical states or percentages, is intended to literally incorporate expressly herein by reference or otherwise, any number falling within such range, including any subset of numbers within any range so recited. For example, whenever a numerical range with a lower limit, $R_L$, and an upper limit $R_U$, is disclosed, any number R falling within the range is specifically disclosed. In particular, the following numbers R within the range are specifically disclosed: $R=R_L+k(R_U-R_L)$, where k is a variable ranging from 1% to 100% with a 1% increment, e.g., k is 1%, 2%, 3%, 4%, 5% ... 50%, 51%, 52% ... 95%, 96%, 97%, 98%, 99%, or 100%. Moreover, any numerical range represented by any two values of R, as calculated above is also specifically disclosed. Any modifications of the invention, in addition to those shown and described herein, will become apparent to those skilled in the art from the foregoing description and accompanying drawings. Such modifications are intended to fall within the scope of the appended claims. All publications cited herein are incorporated by reference in their entirety.

What is claimed is:

1. A method for reducing an amount of (i) glycidol, (ii) glycidyl ester, or (iii) both glycidol and glycidyl ester within a composition comprising a triglyceride, said method comprising:
    contacting the composition comprising a triglyceride with an effective amount of a particulate silica-zirconia catalyst to reduce the amount of (i) glycidol, (ii) glycidyl ester, or (iii) both glycidol and glycidyl ester in the composition, the silica-zirconia catalyst comprising porous silica particles impregnated with zirconia, wherein the porous silica particles comprise silica gel, precipitated silica, or fumed silica particles, wherein the amount of (i) glycidol, (ii) glycidyl ester, or (iii) both glycidol and glycidyl ester is reduced without affecting other components of the composition comprising the triglyceride, and wherein the containing step occurs at a temperature and a reaction time sufficient to reduce the amount of glycidol, glycidyl ester, or both glycidol and glycidyl ester in the composition by more than 95%.

2. The method of claim 1, wherein the silica-zirconia catalyst comprises zirconia located on at least a portion of the surface of the porous silica particles.

3. The method of claim 1, wherein the silica-zirconia catalyst comprises zirconia located in at least a portion of the pores of the porous silica particles or wherein the silica-zirconia catalyst comprises zirconia located substantially in the pores of the porous silica particles.

4. The method of claim 1, wherein the silica-zirconia catalyst comprises particles having a median particle size of from about 0.1 micron (μm) to about 10,000 μm.

5. The method of claim 1, wherein the silica-zirconia catalyst comprises particles having a pore volume of at least 0.01 cubic centimeters/gram (cc/g) as determined by Barrett-JoynerHalenda (BJH) method.

6. The method of claim 1, wherein the silica-zirconia catalyst comprises particles having a median pore diameter of at least 0.1 nanometers (nm) up to about 1,000 nm as determined by a mercury intrusion test procedure using an Autopore IV 9520 available from Micromeritics Instrument Corp.

7. The method of claim 1, wherein the silica-zirconia catalyst comprises particles having a BET particle surface area of at least about 10 $m^2/g$ up to about 2000 $m^2/g$, or greater.

8. The method of claim 1, wherein the silica-zirconia catalyst comprises particles comprising from about 1.0 wt % to about 50.0 wt % of zirconia based on a total weight of the silica-zirconia catalyst.

9. The method of claim 1, wherein the silica-zirconia catalyst comprises particles formed by: impregnating porous silica particles with a soluble zirconium compound in water; drying the impregnated porous silica particles at about 105° C. for about 2 hours; and calcining the dried impregnated porous silica particles at about 500° C. for about 4 hours.

10. The method of claim 1, further comprising: mixing the composition comprising the triglyceride and the silica-zirconia catalyst.

11. The method of claim 1, further comprising: heating the composition comprising the triglyceride and the silica-zirconia catalyst up to a temperature of at least 40.0° C.

12. The method of claim 11, wherein said heating step comprises: heating the composition comprising the triglyceride and the silica-zirconia catalyst up to an uppermost temperature; and maintaining the uppermost temperature for at least 10.0 minutes.

13. The method of claim 1, wherein said contacting step comprises: mixing the composition comprising the triglyceride and the silica-zirconia catalyst under vacuum.

14. The method of claim 1, wherein the composition comprising the triglyceride comprises (i) an edible oil, (ii) an organic solvent, or (iii) both an oil and an organic solvent.

15. The method of claim 1, wherein the composition comprising the triglyceride comprises (i) a triglyceride-based oil, (ii) an organic solvent capable of dissolving triglycerides, or (iii) both a triglyceride-based oil and an organic solvent capable of dissolving triglycerides.

16. The method of claim 1, wherein the composition comprising the triglyceride comprises soybean oil, palm oil, com oil, canola oil, rapeseed oil, fish oil, algal oil, sunflower oil, olive oil, vegetable oil, plant-derived oil, animal-derived oil, microbial-derived oil, or any combination thereof.

17. The method of claim 1, wherein the composition comprising the triglyceride further comprises heptane, hexane, toluene, diethyl ether, an alcohol, or any combination thereof.

18. The method of claim 1, wherein the glycidyl ester within the composition comprising the triglyceride comprises glycidyl oleate.

19. The method of claim 1, wherein the amount of silica-zirconia catalyst comprises from about 0.5 wt % to about 10.0 wt % of the silica-zirconia catalyst based on a total weight of the silica zirconia catalyst and the composition comprising the triglyceride.

20. The method of claim 1, wherein the method reduces the amount of (i) glycidol, (ii) glycidyl ester, or (iii) both glycidol and glycidyl ester to a level of less than 10.0 parts per million (ppm) of (i) glycidol, (ii) glycidyl ester, or (iii) both glycidol and glycidyl ester in the composition comprising the triglyceride.

* * * * *